US012310910B1

(12) United States Patent
Larson

(10) Patent No.: US 12,310,910 B1
(45) Date of Patent: May 27, 2025

(54) CONTOURING BODY MASSAGE DEVICE

(71) Applicant: Ronald A Larson, Anahola, HI (US)

(72) Inventor: Ronald A Larson, Anahola, HI (US)

( * ) Notice: Subject to any disclaimer, the term of this patent is extended or adjusted under 35 U.S.C. 154(b) by 628 days.

(21) Appl. No.: 17/467,093

(22) Filed: Sep. 3, 2021

Related U.S. Application Data

(60) Provisional application No. 63/074,382, filed on Sep. 3, 2020.

(51) Int. Cl.
*A61H 15/00* (2006.01)

(52) U.S. Cl.
CPC ... *A61H 15/0092* (2013.01); *A61H 2015/005* (2013.01); *A61H 2201/0107* (2013.01); *A61H 2201/0126* (2013.01); *A61H 2201/0153* (2013.01); *A61H 2201/0157* (2013.01); *A61H 2201/1614* (2013.01)

(58) Field of Classification Search
CPC .......... A61H 15/0092; A61H 2015/005; A61H 2201/0107; A61H 2201/0126; A61H 2201/1053; A61H 2201/1614; A62B 21/16; A62B 21/169; A62B 21/0552; A62B 21/0557
See application file for complete search history.

(56) References Cited

U.S. PATENT DOCUMENTS 1,560,549 A * 11/1925 Duncan .................. A61H 15/00 601/118
5,569,169 A * 10/1996 Lewark, Sr. ........... A61H 7/001 601/134
5,730,708 A * 3/1998 Spratt .................... A61H 7/003 601/118
6,241,693 B1 * 6/2001 Lambden ........... A61H 15/0092 601/129
2005/0202944 A1 * 9/2005 Deal .................. A63B 21/0004 482/121
2016/0030278 A1 * 2/2016 Faussett ............. A61H 15/0092 601/119
2016/0263419 A1 * 9/2016 Sassano ............. A63B 23/1254
2017/0021219 A1 * 1/2017 Kelly ................. A63B 21/4033

* cited by examiner

*Primary Examiner* — Colin W Stuart
*Assistant Examiner* — Douglas Y Sul

(57) ABSTRACT

A massage device that contours and encompasses the body that employs massage nods or balls at two end points and employing attachable separate accessories clip on platforms for housing and supporting interchangeable nods or balls that can be placed and added onto two C shaped long gated members, or for Embodiment 2# a Loop Ring, C shaped members having four end points, upper and lower. C shaped members units, providing a means of a coupling of said C shaped members units to be adjustable and rotational and providing for a disconnecting link. The hand tool massage device having two rotating adjustable locking handles for comfort and control, with said eye rings at its two lower end points, for connecting a rope or strap with three snap links, with one of three snap links, linking the device to a anchored point, while other said two snap links are linked into said eye rings of the two C shaped members. Creating a triad pulley like system, providing a means for the users body weight to be employed into the system in between the C shaped members wherein massage nod's or ball's are placed onto treatment area of user's body, preferably the back, adding pressure onto selected massage points of the users body. That is controlled by the users hands and arms for a deep like massage.

2 Claims, 7 Drawing Sheets

CONTOURING BODY MASSAGE DEVICE

FEDERALLY SPONSORED RESEARCH DEVELOPMENT

"Not Applicable"

REFERENCE TO SEQUENCE LISTING

"Not Applicable"

BACKGROUND OF THE INVENTION

Field of Invention

The present invention is in the technical field of therapeutic body massage. This invention relates to nonelectrical hand held massage devices commonly used by people with tiered sore acing bodies of all trades and professions in a given society. More specifically, this invention relates to various massage devises such as hand held massage devises such as the back massage stick device's also called Tera canes. The device's that more closely relates to this invention is known as the shiatsu massage sticks and also known as lomi lomi sticks.

Description of Related Art

Any discussion of the prior art throughout the specification should in no way be considered as an admission, that such prior art is widely known or forms and of part's of common general knowledge in the field.

Nonelectrical Hand held massage devices are commonly used throughout society and many cultures throughout the world. Such said devices are used to relieve tension, stress and cramped mussels throughout the body. Typical methodologies for using such hand held self massage devices, is to employ the mussels of the body to bring about relief to the body. This invention transverse that duty over to the weight of the body and gravity. Allowing the user to be in and remain in a relaxed state.

Most if not all of the nonelectrical Hand held massage devices, on the market have two main components, being the massage ball or balls or also what is referred to as nodes, also housed rolling balls, connecting to a rod or stick or some sort of ridged support that employs the hands by the one using the device or by another person giving a massage to another person. Many such devices can be small and used by one hand or large requiring two hands to operate. Such devices can employ one massage ball or a number of massage balls or nodes.

BRIEF SUMMARY OF THE INVENTION

The present invention is a body massage device that encompasses and contours to the body of the user, that is controlled by the hands and arms. This device can be employed in three different ways. One way is the 'UN-anchored Method' and the a second method is the 'Anchored Method' as well as the 'Detached Method' a third Method, which refers to what is known as the traditional shiatsu stick method.

This hand held massage device, when deployed in the Anchored method, achieves in producing the desired relief to the body of the user, by the user, by making use of his or her body weight, in order to place pressure upon certain points of the body, desired to be massaged by the user. This is achieved by employing a rope or strap with three snap links while one of the said snap links is anchored to a wall, door or some other sort of sold object such a vehicle or tree. while the other two snap links are linked to the end points of said device.

The UN-anchored Method, is accomplished by employing the device in concert with the hands and arms in order to apply the necessary pressure to the desired areas of the body such as shown in FIG. 5. This invention in all it's embodiment's can be employed in a standing position or in a sitting position of the user.

The Unattached Method of operation, as an additional benefit, is achieved when the two main components, FIG. 1 right side 9,10 is detached from the left side 9,10 away from one another by means of a linkage and are then used separately as a traditional method, known as shiatsu massage stick method. Not provided in drawings of said method.

BRIEF DESCRIPTION OF DRAWINGS

FIG. 1 is a top view of the Contouring Body Massage Device with a black foam covering for comfort and durability. But not limited to. 9 L/R is lower left and right C shaped members, 10 L/R upper left and right C shaped members, 11 is a bungee or rubber strap 'but not limited to' linking both L/R members, 12 L/R massage balls, 13 are L/R pivot and release pins, 'but not limited' to. 14 are L/R eye hook rings, 15 are L/R pivot and lock ring fasteners, but not limited to.

FIG. 2 is a front view of the Contouring Body Massage Device with black foam covering. 9 L/R is lower left and right C shaped tubing members, 10 L/R are upper left and right C shaped tubing members, 11 is a bungee or rubber strap, 12 are L/R massage balls, but not limited to. 13 point to L/R pivot and release pins, 14 are L/R eye hook rings, 15 are L/R pivot and lock ring fasteners, but not limited to.

FIG. 4 shows slight angle "but not limited to" on L upper C shaped tubing members. 'Note' right side not shown in this FIG. 4

DETAILED DESCRIPTION OF INVENTION

The present invention is a massage device for the body that is nonelectrical, but not limited to being eclectically adapted. Such said massage device encompasses and contours to the body while being controlled by the hands and arms of user while employing the weight of user.

FIG. 1-7 right side 9,10 upper and lower sections of C shaped tubing members and left side 9,10 upper and lower sections of C shaped tubing members, "but not limited to just tubing", making up the main structure of the invention. At the top end area of both said C shaped tubing members are 10 L/R units, are joined with two 12 L/R massage balls (but not limited to just two) that are fastened to the end point of said tubing members, that can be changeable with other type nods or ball components fixed or moving. 12 L/R providing a means for a point of contact with the body of user.

Both C shaped members structures are joined together approximately at the top end of 10 L/R of the bend's of the C shaped tubing members. Both left and right sides can be joined in a multiple of ways. Such as a rubber strap or adjustable turnbuckle eye bolts or a adjustable slide bar in a piston and housing in combination with a stop and lock system for width adjustment. It can also be fastened by employing the means of a rope a cable or chain est, 'but not limited to'. The distance between both C shaped tubing units, is adjustable in distance and length. All of which can be detached by means of snap and release fasteners such as locking pins 'but not limited to' that provide a means for a swivel to take place. Holes are board into of the said tubing members of 10 L/R both left and the right sides to house's an anchor for said quick release fasteners. This is done so that both C shaped member units of the device can separate and then can be employed into a method of a traditional shiatsu stick or cane style.

Figure 8:
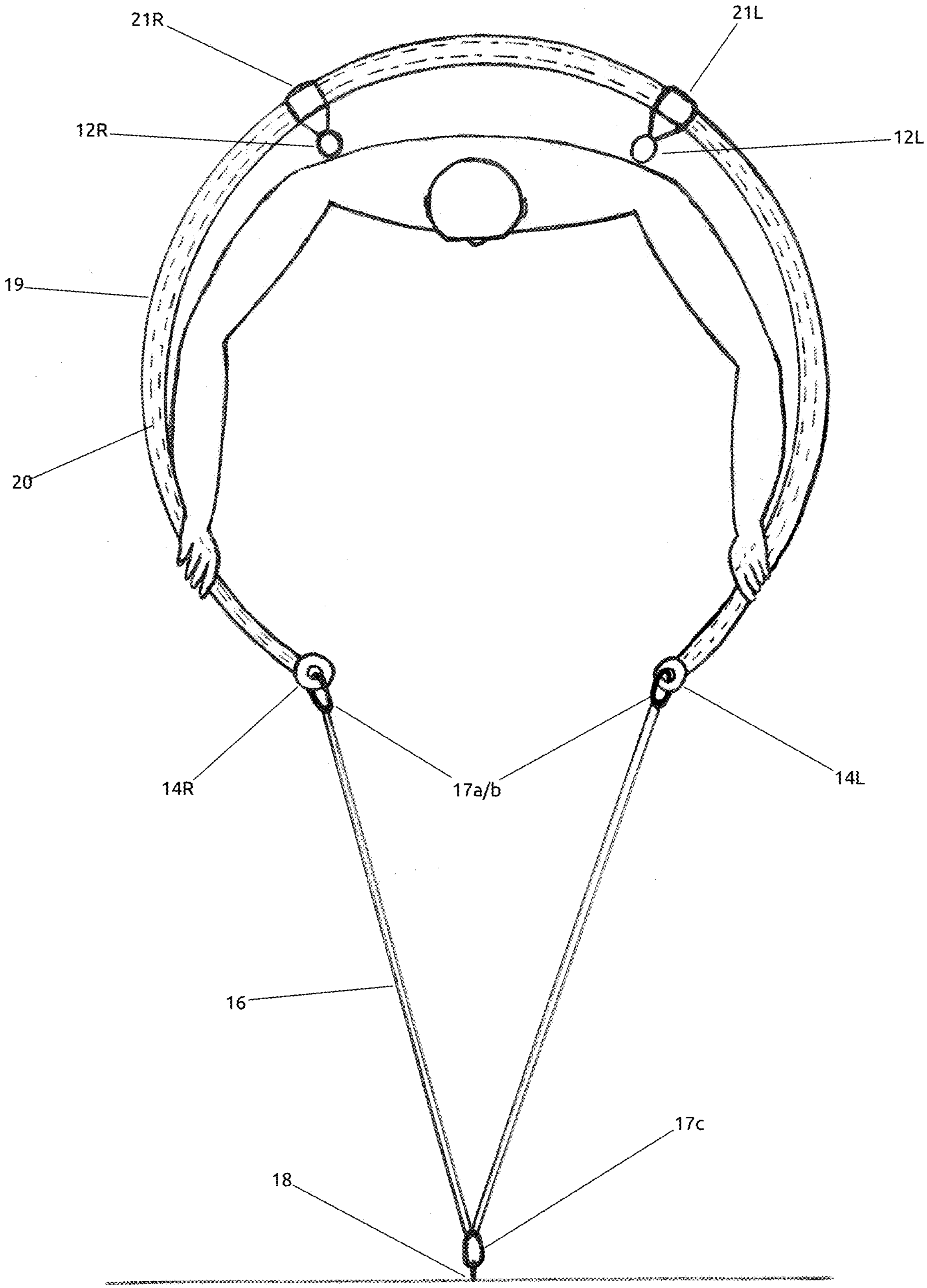
FIG. 8 is a top view of the #3 embodiment Contouring Loop Body Massage Device. 12 are L/R massage balls, 14 are L/R eye hook rings, 16 is a strap or rope "but not limited to". 17*a,b,c* are snap links, 18 is an anchored point. 19 is a outer sleeve tubing, 20 is a inner cable or rope, 21 L/R clamp and lock to tubing platform's housing and supporting for 12R/L massage balls.
Figure 9:
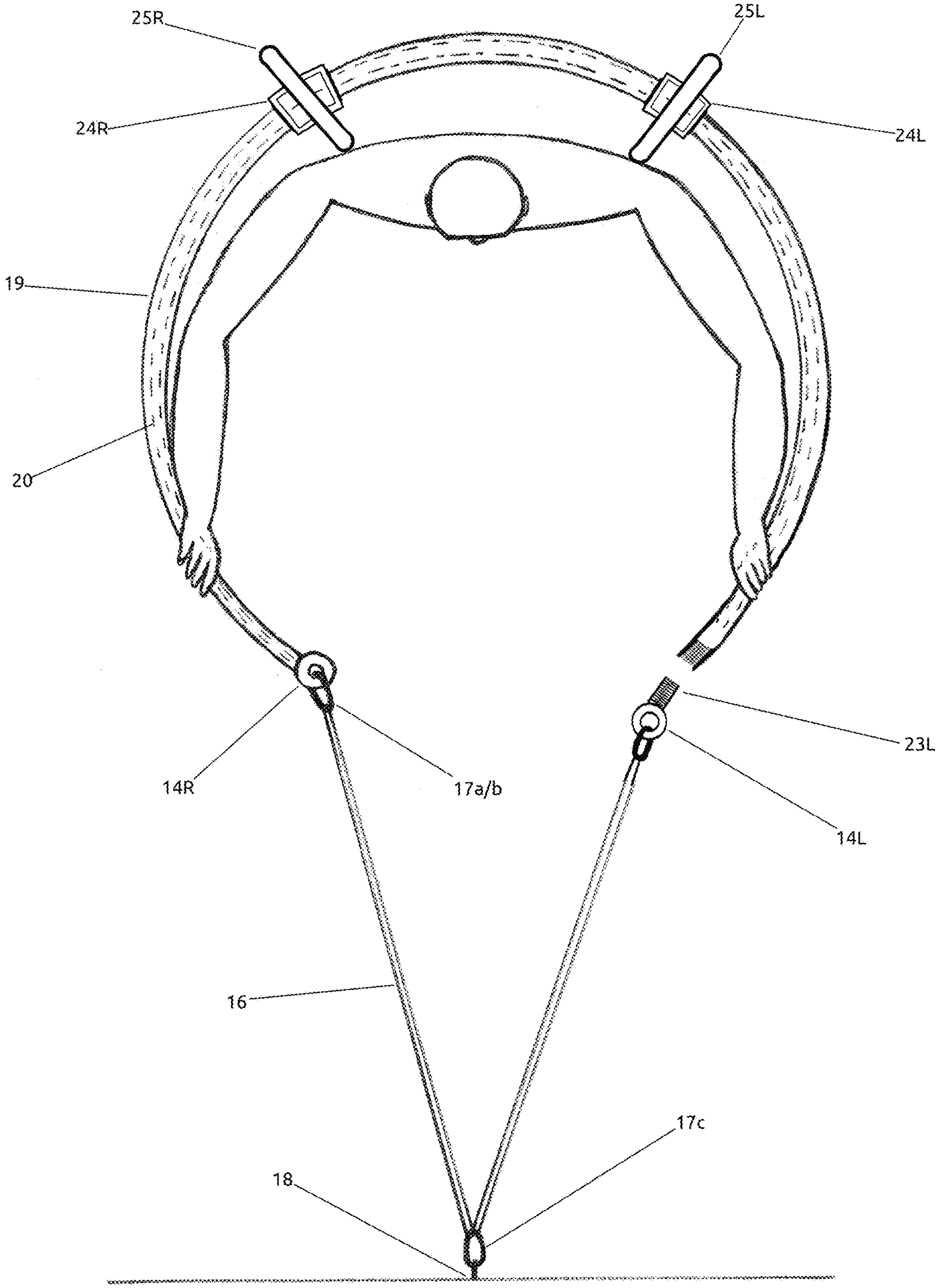
FIG. 9 is a top view of 4# embodiment Contouring Loop Body Massage Device. 14 are L/R eye hook rings, 16 is a support line, strap or rope "but not limited to". 17*a,b,c* are snap links, 18 is an anchored point. 19 is a outer sleeve tubing, 20 is a inner cable or rope, 23 is a screw fastener to inner cable, 24 L/R are roller axles and housing, 25 are L/R massage rollers.

FIG. 1-7 14 R/L eye ring's are fastened and secured at the bottom end point of both 9 L/R C shaped tubing members, in so that snap links 17*a,b* can be employed, by clipping and linking on to the device. Whereas both said 14 R/L eye ring's can embody a snap and link eye ring combination for easy employment with strap or rope 16. Snap links 17*a,b* are then linked and attached to said 16 strap or rope, then said 16 strap or rope is linked to said 18 anchor point by the means of a third snap link 17*c*. Thus in-concert with the users body weight, providing a means for the necessary needed pressure onto the body, by employing a pulley like system, into action. Thus providing a way of putting adequate pressure onto the body of the user, by employing the weight of the body of user for a deep like massage to the user. "Note that FIG. 8 and FIG. 9 are described in Variations"

Method of Manufacture

The preferred method of manufacturing of such a device requires a tube bending machine or a tube bending leverage device. This is done to attain the C shape of 9,10 L/R that makes up the main structure of the invention, thus in combination with a slight lateral bend onto 10 L/R members, in order to better conform to the body and for better control of the device.

Components include a total of 15 part's of said device, 11 of the said 15 parts are Pr-manufactured components and can be assembled onto the main L/R C shaped tubing member units. In one way this can be achieved is by drilling holes in approximate distance to the top end of said L/R C shape tubing member units for the said fasteners 13 R/L and bungee strap 11, to join together the L/R C shaped Tubing members, that make up the main body of the device. Other components can be joined onto the main structure by means of glue and/or a screw process, particularly with the said massage balls 12 L/R and eye rings 14 L/R. Other components include a foam cushion sleeves that can be slid onto tubing members during assembly or warped and or heat warped onto to the tubing member units.

Method of Use

This invention is a hand held massage device that can be employed in number of ways by the user. Such as using the device on the lower extremities of the body, such as the legs and buttocks. However the arrears most preferred for massage is the back and neck areas of the body.

The most preferred method for this Invention is the anchor and lean method. Thus being the most preferred method. This is achieved by employing a pulley system type action, by anchoring the device to a sold point onto an object, such as a wall, door a post a beam or a vehicle or even a tree. This is done by employing a 16 strap or rope and 17*a,b,c* three snap rings. This massage device achieves a far better and a far deeper massage to the user's body, by making use of the user's body weight. This is done, by placing a precise amount of pressure, decided and managed by the user, upon the points of the body, to be massaged. This is done by the user, leaning into a backwards direction into the device away from the anchor point as illustrated best in FIG. 6.

Figure 5:
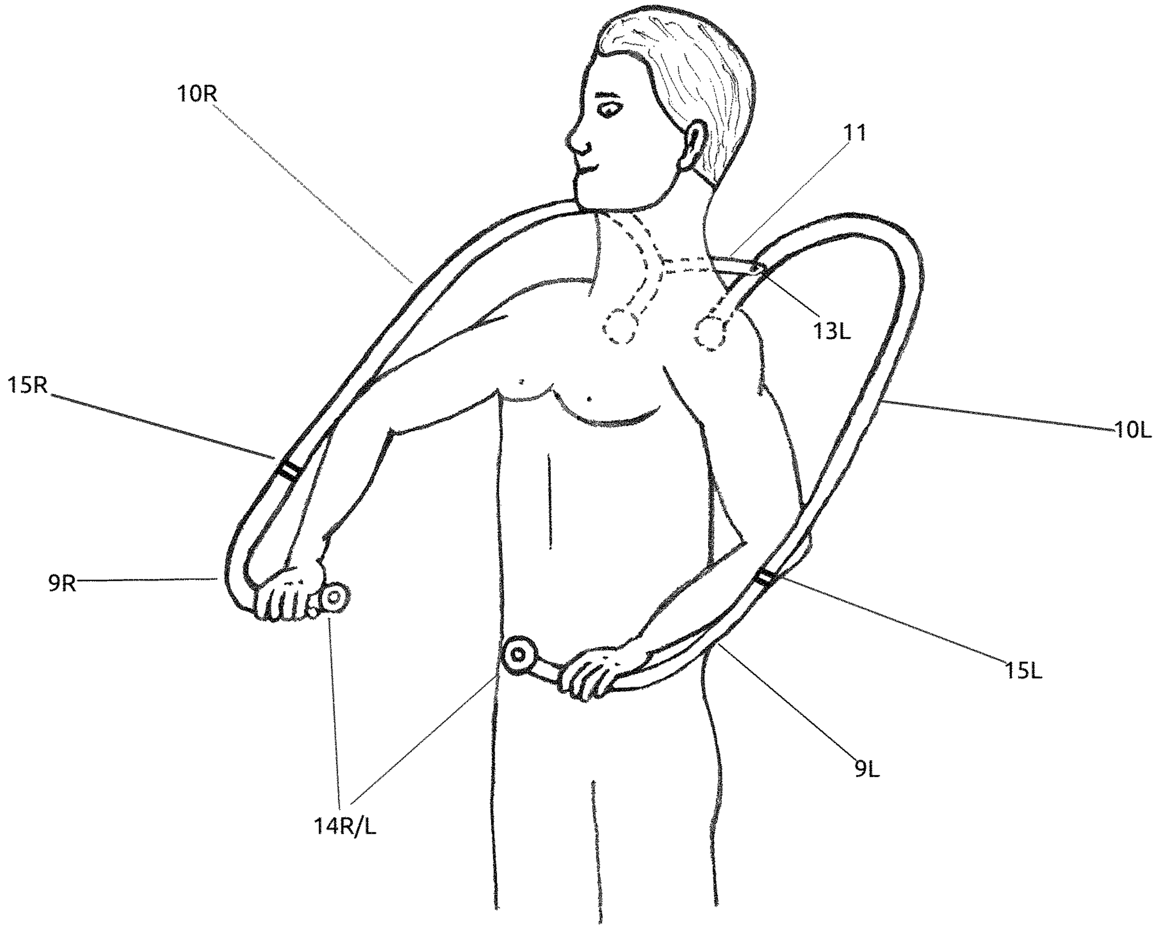
FIG. 5 is a perspective view of the Contouring Body Massage Device without black foam covering, being deployed by user. 9 L/R is lower left and right C shaped tubing members, 10 is L/R upper left and right C shaped tubing members, 11 is a bungee or rubber strap, 12 are L/R massage balls shown by projection lines, 13 L/R pivot and release pin, 14 L/R eye hook rings, 15 L/R pivot and locking ring fasteners.
Figure 6:
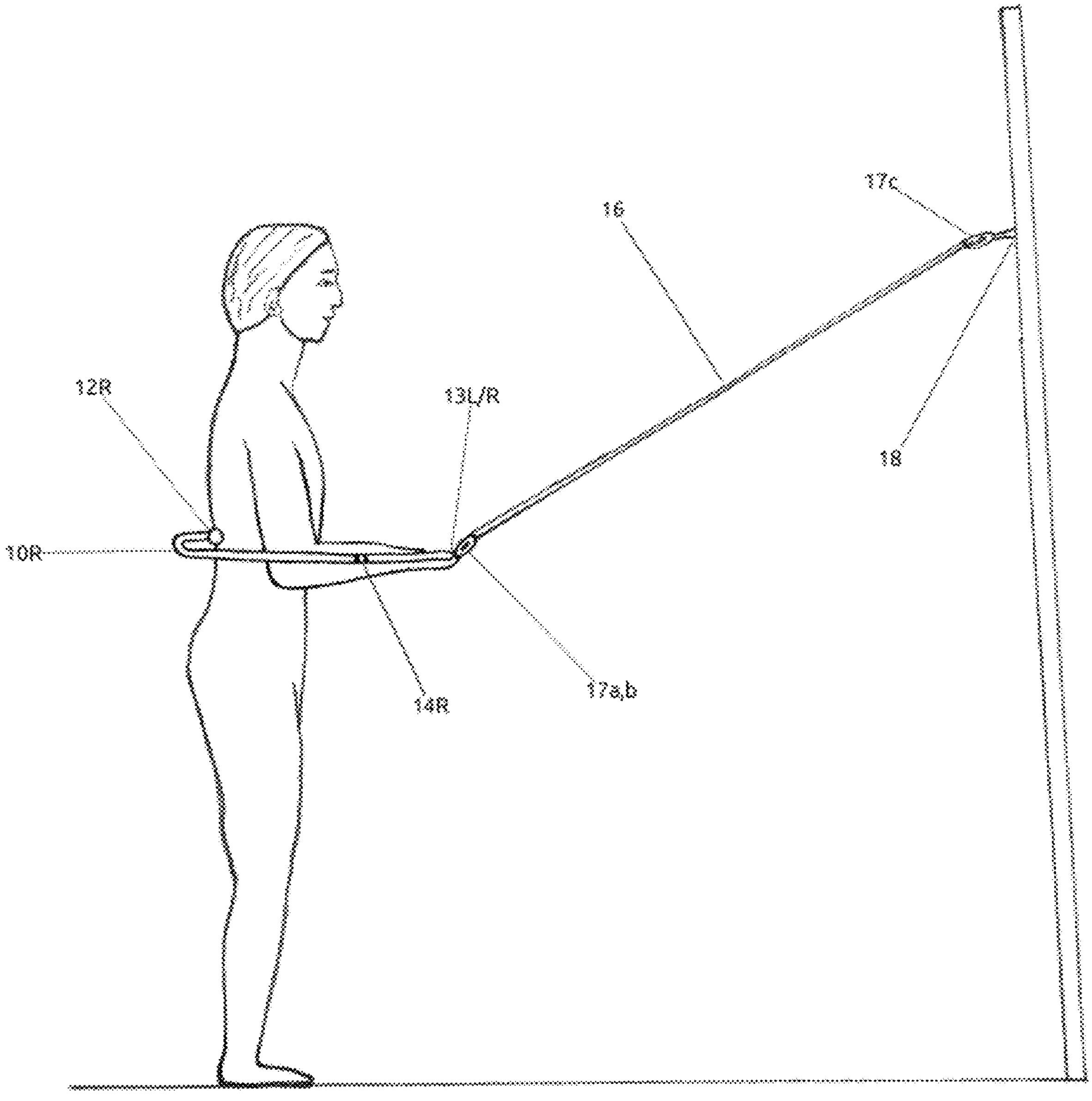
FIG. 6 is a side view of the Contouring Body Massage Device employed by user. with out black foam covering. 12 R shows right side ball of massage balls, 14 L/R points to right and left side eye hook rings, 15 R is pivot and locking ring fasteners, 'but not limited to'. 16 is strap or rope, 17*a,b* are snap links, 17*c* is snap link attached to 18 a anchored point. 13 points to L/R pivot and release pin, but not limited to. 10 R is upper C shaped tubing members 'but not limited to' just a C shape. 9 R is lower C shaped tubing members.
Figure 7:
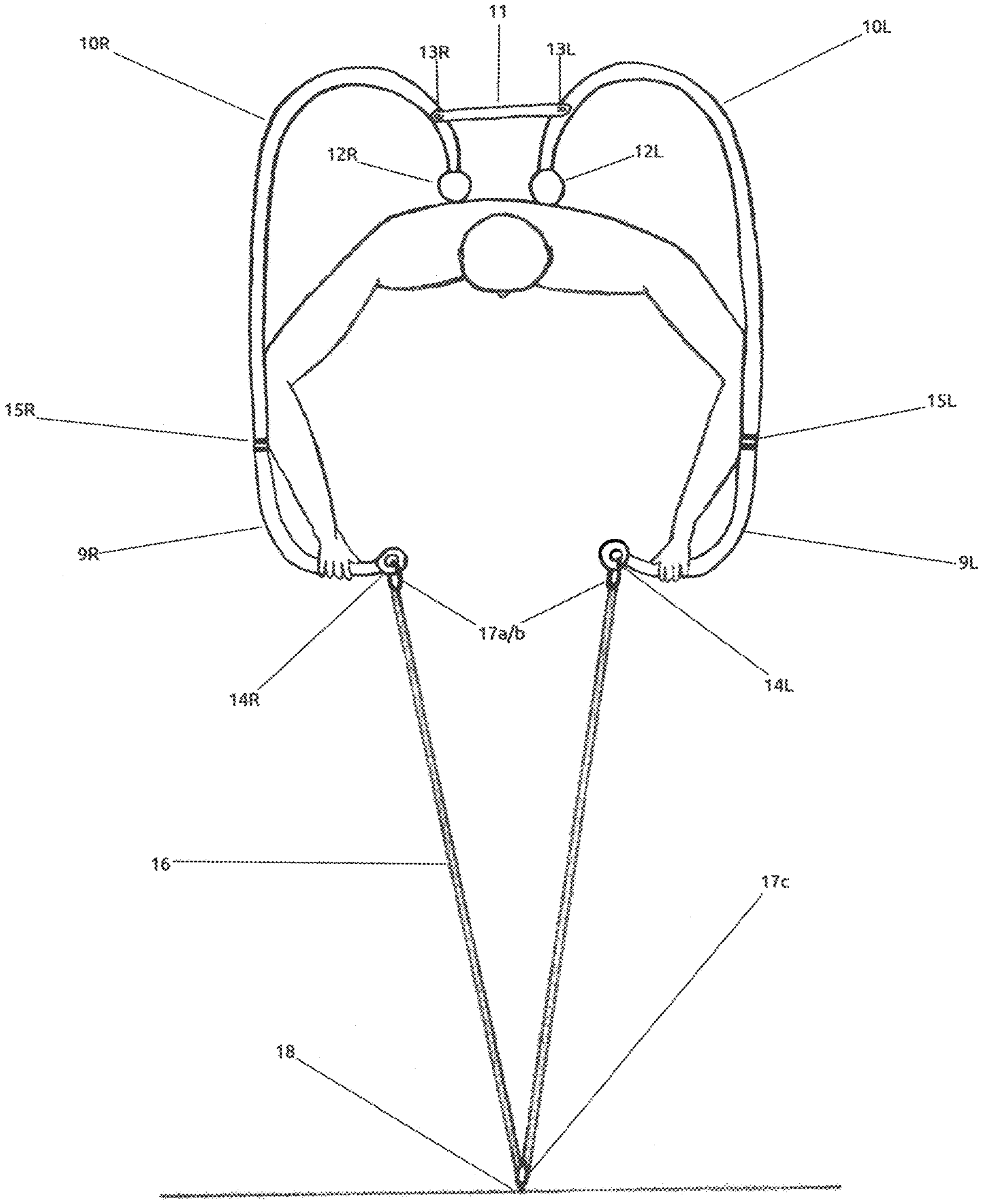
FIG. 7 is a top view of the Contouring Body Massage Device. without black foam covering. 9 L/R is lower sections of C shaped tubing members, 10 L/R upper sections of C shaped tubing members, 11 is a bungee or rubber strap, 12 L/R massage balls, 13 L/R pivot and release pins, 14 L/R eye hook rings, 15 are L/R pivot and lock ring fasteners, 16 is strap or rope, 17*a,b,c* are snap links, 18 is an anchored point.

The second most preferred method is the stand alone UN-anchored method. As shown in FIG. 5 The user apply,s force onto 9 L/R lower left and right griping handles transferring pressure onto 12 L/R massage balls while directing massage balls onto areas, the user desires to be massaged. This second preferred method, because it requires physical strength from the user, in order for a deep massage to occur.

FIG. 1-7 by means of 15 L/R pivot and lock ring fasteners. The 9 L/R hand grip swivel method 2# embodiment. Lower sections Left and Right can unlock from 10 L/R upper sections while staying attached, can then swivel up or down or all the way around 360 degrees. Thus providing for a more dynamic action for a deeper massage experience for the user. This said dynamic provides for more comfort and relaxation for the user, while providing better control of the device. This 2# embodiment can can also employ adjustable kaleidoscope handles to accommodate different arm lengths and body sizes.

FIG. 8 The loop ring and lean method 3# embodiment and method of use. This #3 embodiment and method of operation, can operate the same as the 1# main embodiment preferred method. Embodiment's 2# 3# and 4# and can also operate as the same as #1 embodiment's method and operation in the anchored mode of operation. In the UN-anchored method FIG. 5. the operation without being anchored, thus said method reduces the pressure, that can be put on the body thus reducing the depth of the massage of the body of the user.

The preferred method of this #3 embodiment, produces different results. This said embodiment is a soft system and not being ridged and hard like the main #1 embodiment. This said embodiment provides for the loop to contour and shape around the body as the user leans away from the anchor point, as the user apply,s more weight into the system. Thus producing a squeeze effect on the body that can work to an advantage, being that the user can move and adjust the massage balls on the loop ring as desired by employing the 21 L/R clamp and lock housing mechanism that are attached to the ring providing a platform for the 12 L/R massage balls or nodes.

This 3# embodiment allows for the 12 L/R massage balls by means of 21L/R housing units to be removed and re-positioned onto loop ring, allowing for the user to place 12 L/R massage ball onto the desired areas of body by means of employing the loop ring for a better positioning for a deeper massage. Thus also allowing for more than two 12 L/R massage balls or nodes to be added and deployed on the loop ring at the same time.

Figure 1:
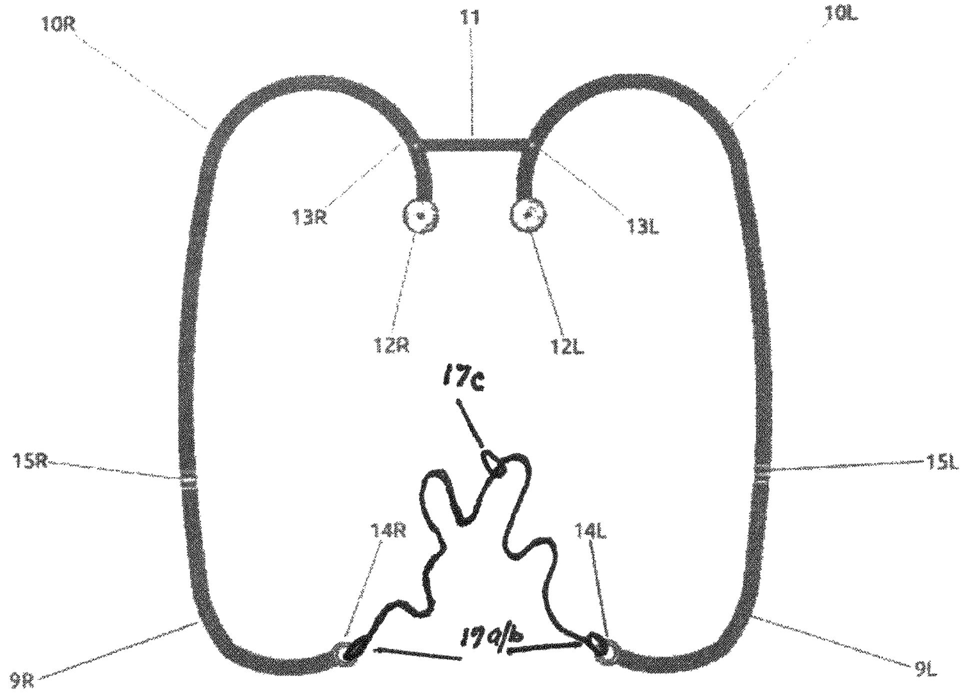
Figure 2:
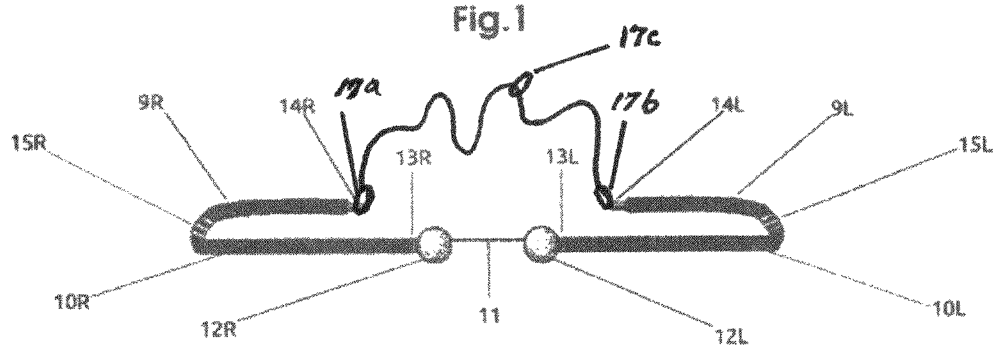
Figure 3:
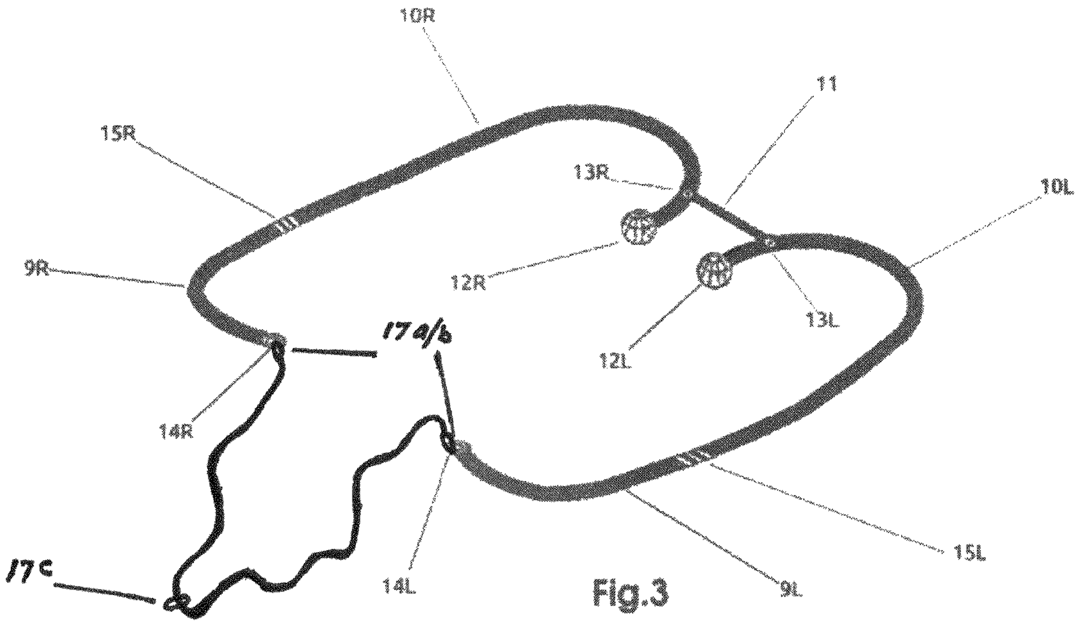
FIG. 3 is a perspective view of the Contouring Body Massage Device with black foam covering. 9 L/R lower left and right C shaped tubing members, 10 L/R upper C shaped tubing members, 11 is a bungee or rubber strap, 12 are L massage balls, 13 are L/R pivot and release pins, 14 are L/R eye hook rings, but not limited to. 15 are L/R pivot and locking ring fasteners "but not limited to".
Figure 4:
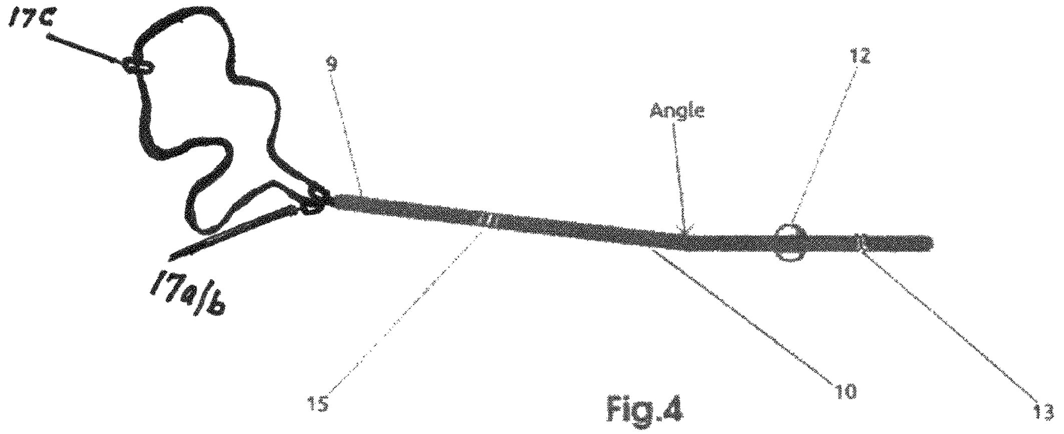
FIG. 4 is a side view of the Contouring Body Massage Device with black foam covering. 9 L is lower C shaped tubing members, 10 L upper C shaped tubing members, 12 L massage balls, 13 L pivot and release pins, 15 L is pivot and lock ring fasteners.

FIG. 9 4# embodiment method of operation is the same as embodiment's #1 #2 #3. The 4# embodiment of FIG. 9 is that 24 R/L platforms with 25 R/L rollers, slide on to loop ring 19 and 20 by means of eye ring's 23 L disconnect point "Note that Right side can be used as a disconnect point as well".

Variations

There are four variations of said massage device. The #2 embodiment is when both the right and left C shaped tubing member units are cut approximately 5 to 15 inch's above the lower bend hand griping section 9 L/R creating two parts an upper members and lower members. Whereas between said existing members 15 R/L, is added on as a pivot and lock ring system and employed into the massage system. Thus providing for a more dynamic control and flexibility to the over all massage system. (Note this #2 embodiment is not necessary for the device to function and is not limited to) This said #2 embodiment enables for the system to be controlled in a more precise way and creating an opportunity for better positioning of the 12 L/R massage balls attached to the 10 L/R upper section of the massage device. This 2# embodiment can can also employ adjustable kaleidoscope handles to accommodate different arm lengths and body sizes.

FIG. 8 #3 embodiment with accessories 21 and 12 that can be added onto the massage device #1 and #2 embodiment's and positioned any where along the both the left and right C shaped tubing member units for add contact surface to the body for added massage relief. Such said accessories are with massage balls or nodes that are with strap clamp and lock downs to hold them in position. Accessories platform 21 in combination with 12 L/R massage balls or nodes, can be add and positioned by the user for a more dynamic massage. Such said accessories device 21 L/R also can be employed in onto all embodiment's and not limited to two accessory devices.

#3 embodiment FIG. 8 is without said C shaped tubed member units. And rather employs a one complete 20 cable or rope like device that is sleeved and in-cased by 19 a flexible tubing member 19 with 14 L/R two pull eye rings at each of it's end. This is for the said 17*a,b,c* three said snap links with 16 strap or rope to be attached and anchored to a fixed point 18 and to be employed as described in main #1 embodiment. This said #3 embodiment also employ's said accessories 12 L/R massage balls device and 21 clamp and lock down platforms but not limited to. Two or more of 21 L/R accessories platform devices with 12 L/R massage balls can be employed by the user onto any area of cable 19 and sleeve 20 outer tubing, that is desired by the user.

#4 embodiment FIG. 9 Detachable and Adjustable slide and lock rolling units. Two eye rings 14R/L, can detach from end points of said cable loop with sleeve 20, 19. Said eye-bolts 14L/R providing a means for said rope or a strap 16, to link to said eye rings 14L/R, preferably by means of three snap links 17*a,b*. Whereas said rope or strap, preferably strap 16, is then attached and anchored by the means of one of the said three snap links c, is then linked to a static fixed anchoring point 18. By removal of one said eye-bolts, attachments and accessories. Such attachments 24 and 25 that can then be slide on to cable and sleeve at end points 23 L to then be employed, at any point on the loop and locked down at any desired point of said loop, Such said accessories and attachments can work together or independently and can be locked into place or locked to one another. such accessories and attachments would include and be not limited to. Rolling wheels and Node platforms and vibrating platforms etc.

In broad embodiment, the present invention is a hand held massage device of any shape and size, with a methodology. While the forgoing written description of the invention enables one of ordinary skill to make and use what is considered, presently to be the best mode thereof, those of ordinary skill will understand and appreciate the existence of variations, combinations, and equivalents of the specific embodiment's, methods, and examples herein. The invention should therefore not be limited by the above described embodiment's, methods and examples, but by all embodiment's and methods within the scope and spirit of the invention as claimed.

What is claimed is:

1. A hand-held massage device comprising:

a pair of rigid C-shaped members, each C-shaped member comprising a first upper portion having a first radius of curvature and a second lower portion having a second radius of curvature; a pivot and locking ring attachment provided between the first upper portion and the second lower portion configured to allow the first upper portion to swivel 360 degrees with respect to the second lower portion, the first upper portion having a top end including a massage node or ball configured to provide a surface to engage a treatment area, and the second lower portion having a lower end including an eye ring; and a linkage comprising a first end and a second end, a first pivot pin connecting the first end of the linkage to a first of the pair of rigid C-shaped members, and a second pivot pin connecting the second end of the linkage to a second of the pair of rigid C-shaped members, the first and second pivot pins configured to allow the linkage to be adjustably rotatable to the respective first and second of the pair of rigid C-shaped members.

2. The hand-held massage device of claim 1, further comprising:

a first snap link configured to connect to the eye ring of the first of the pair of rigid C-shaped members;

a second snap link configured to connect to the eye ring of the second of the pair of rigid C-shaped members;

a third snap link configured to connect to an anchored point; and a strap or rope configured to connect to the first, second, and third snap links to provide a three-point pulley system.

* * * * *